(12) United States Patent
Bretthauer et al.

(10) Patent No.: US 12,461,358 B2
(45) Date of Patent: Nov. 4, 2025

(54) PIEZOELECTRIC MICRO MIRROR WITH CORRUGATED ACTUATOR AND SUSPENSION SYSTEM

(71) Applicant: Infineon Technologies AG, Neubiberg (DE)

(72) Inventors: Christian Bretthauer, Munich (DE); Malika Bella, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 694 days.

(21) Appl. No.: 17/749,509

(22) Filed: May 20, 2022

(65) Prior Publication Data
US 2023/0375825 A1 Nov. 23, 2023

(51) Int. Cl.
*G02B 26/08* (2006.01)
*B81C 1/00* (2006.01)
*G02B 26/10* (2006.01)

(52) U.S. Cl.
CPC ...... *G02B 26/0858* (2013.01); *B81C 1/00142* (2013.01); *G02B 26/101* (2013.01)

(58) Field of Classification Search
CPC .............................................. G02B 26/00–129
USPC ............................................. 359/196.1–226.3
See application file for complete search history.

(56) References Cited

U.S. PATENT DOCUMENTS

2013/0114149 A1* 5/2013 Michael ............... H10N 30/206
359/822

* cited by examiner

*Primary Examiner* — Jessica M Merlin
(74) *Attorney, Agent, or Firm* — Harrity & Harrity, LLP

(57) ABSTRACT

A light steering system includes: a reflective structure configured to tilt about a first axis; a frame that includes a frame recess over which the reflective structure is suspended; and a suspension assembly that includes a piezoelectric corrugated structure coupled to and between the reflective structure and the frame. The piezoelectric corrugated structure includes a first corrugated surface including concentric rings of alternating peaks and valleys; a second corrugated surface arranged opposite to the first corrugated surface; a plurality of peak electrodes, each peak electrode being coupled to a respective peak of the first corrugated surface; a plurality of valley electrodes, each valley electrode being coupled to a respective valley of the first corrugated surface; and a common electrode layer coupled to the second corrugated surface, wherein the common electrode layer is arranged counter to the plurality of peak electrodes and to the plurality of valley electrodes.

27 Claims, 11 Drawing Sheets

PIEZOELECTRIC MICRO MIRROR WITH CORRUGATED ACTUATOR AND SUSPENSION SYSTEM

FIELD

The present disclosure relates generally to a microelectromechanical system (MEMS) system and method for operating the same.

BACKGROUND

Two-dimensional (2D) scanning is a type of scanning that utilizes two scanning axes to steer light in a 2D plane of a field of view. It can be implemented in display applications, light scanning applications, and other light steering applications. For example, light scanning may be used in displays, Light Detection and Ranging (LIDAR), and automotive headlights in which light beams are steered by a scanning system according to a Lissajous pattern.

Lissajous scanning is one type of 2D scanning that is typically done by two resonant scanning axes which are each driven at different scanning frequencies with a defined frequency ratio/difference therebetween that forms a specific Lissajous pattern and frame rate. Either two one-dimensional (1D) microelectromechanical system (MEMS) mirrors or one two-dimensional (2D) MEMS mirror may be used to achieve 2D scanning, such as Lissajous scanning. These MEMS mirrors may be used to steer light according to a desired scanning pattern. MEMS mirrors relying on piezoelectric actuation generally use, for each scanning axis, a pair of cantilever beams as an actuator that drives the respective scanning axis. However, the cantilever beams limit reachable force for tilting the MEMS mirror, thereby limiting the maximum tilt angle about a scanning axis, and can pose reliability issues (i.e., they are vulnerable to breakage and failure).

Thus, a scanning system with improved piezoelectric actuators may be desirable.

SUMMARY

One or more embodiments provide a light steering system, including: a reflective structure configured to tilt about a first axis; a frame that is rotationally fixed, the frame including a frame recess over which the reflective structure is suspended; and a suspension assembly mechanically coupled to and between the reflective structure and the frame, the suspension assembly configured to suspend the reflective structure over the frame recess. The suspension assembly includes: a piezoelectric corrugated structure coupled to and between the reflective structure and the frame. The piezoelectric corrugated structure includes: a first corrugated surface including concentric rings of alternating peaks and valleys; a second corrugated surface arranged opposite to the first corrugated surface; a plurality of peak electrodes, each peak electrode being coupled to a respective peak of the first corrugated surface; a plurality of valley electrodes, each valley electrode being coupled to a respective valley of the first corrugated surface; and a common electrode layer coupled to the second corrugated surface, wherein the common electrode layer is arranged counter to the plurality of peak electrodes and to the plurality of valley electrodes.

BRIEF DESCRIPTION OF THE DRAWINGS

Embodiments are described herein making reference to the appended drawings.

DETAILED DESCRIPTION

Figure 1:
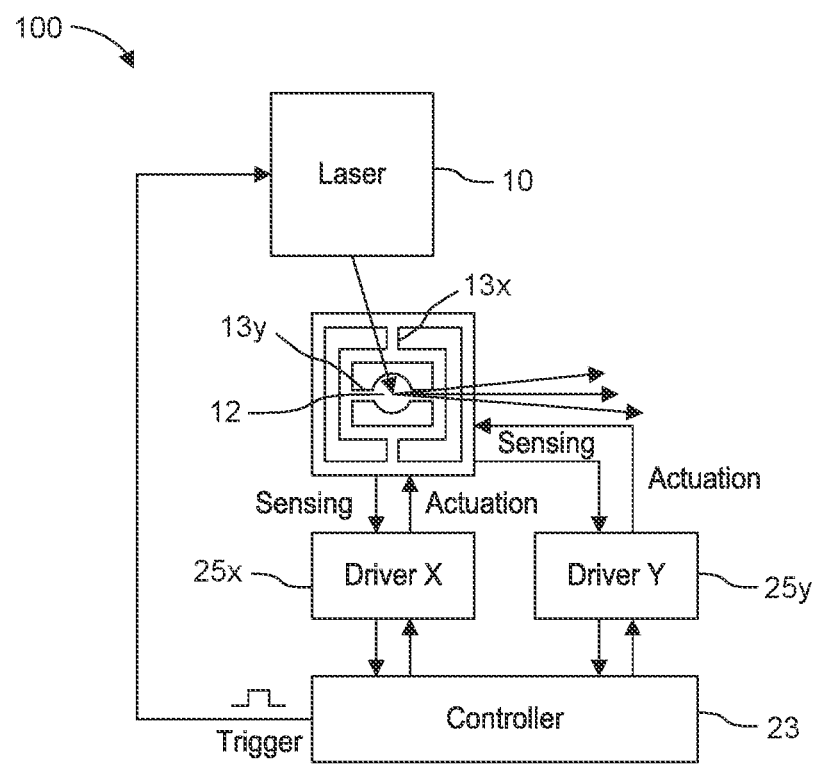
FIG. 1 is a schematic block diagram of a 2D scanning system according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter, or a filter. A sensor device may be integrated on a single chip, although in other embodiments a plurality of chips or also components external to a chip may be used for implementing a sensor device.

Moreover, embodiments may relate to optical transmitters and optical transmitter systems configured to transmit light beams or pulses according to a scanning pattern, and, more particularly, according to a Lissajous scanning pattern. Light beams include visible light, infrared (IR) light, or other type of illumination signals. In some applications, the transmitted light may be backscattered by an object back towards the system where the backscattered light is detected by a sensor. The sensor may convert the received backscattered light into an electric signal, for example a current signal or a voltage signal, that may be further processed by the system to generate object data and/or an image.

Lissajous scanning is a type of scanning implemented in display applications, light scanning applications, and light steering applications, to name a few. For example, Lissajous scanning may be used in displays, Light Detection and Ranging (LIDAR), and automotive headlights in which light beams are steered by a scanning system according to a Lissajous pattern. Lissajous scanning is typically done by two resonant scanning axes which are each driven at constant scanning frequency with a defined frequency ratio/difference therebetween that forms a specific Lissajous pattern and frame rate.

Lissajous scanning may be used in extended reality (XR) technologies. For example, augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eye-glasses, smart contact lenses, head-up displays (HUDs), and head-mounted displays (HMDs), or projected directly onto a user's retina, as is the case for virtual retinal displays.

Virtual reality (VR) is a technology that entirely replaces the real-world environment of a user with a computer-generated virtual environment. Thus, a user is presented with a completely digital environment in which computer-generated stereo visuals surround the user. In a VR simulated environment, a VR headset that provides 360-degree vision may be used.

A mixed reality (MR) experience combines elements of both AR and VR such that real-world and digital objects interact. Here, a real-world environment is blended with a virtual one.

These technologies, as well as others that enhance a user's senses, may be referred to as extended reality (XR) technologies. A microelectromechanical system (MEMS) mirror-based laser beam scanner (LBS), as the one described herein, is one way to implement XR technologies. The laser beam scanner is capable of delivering small form factor, low power consumption, and high brightness at a relatively low system cost.

In LIDAR systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm. For example, an ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

A scan such as an oscillating horizontal scan (e.g., from left to right and right to left of a field of view) or an oscillating vertical scan (e.g., from bottom to top and top to bottom of a field of view) can illuminate an area referred to as the "field of view" in a continuous scan fashion. Each firing of the laser beam by the light sources can result in a scan line in the field of view. By emitting successive light pulses in different scanning directions, an image can be projected into the field of view, as is the case in XR technologies, or the field of view can be scanned and objects within the area can be detected and imaged, as is the case in LIDAR technologies.

The requirements for of a scanning system depend on the application and the system. One or more embodiments presented herein may require a scanning system with a mirror diameter that is greater than 1.5 mm, can be driven with maximum tilting amplitudes greater than 5° about each resonant scanning axis, a low operating voltage (i.e., a low driving voltage) which can be especially critical for conserving power in mobile devices, a sum of tilt mode resonance frequencies (f1+f2) of the two scanning axes is greater than 35 kHz (with common mode resonance reasonably far away), and a die size of less than 7×6 mm².

FIG. 1 is a schematic block diagram of a 2D scanning system 100 according to one or more embodiments. The 2D scanning system 100 includes a single two-dimensional (2D) MEMS mirror 12 that is used to steer or otherwise deflect light beams (e.g., pulses) according to a 2D scanning pattern, such as a Lissajous scanning pattern or a circular scanning pattern.

The MEMS mirror 12 is a mechanical moving mirror (i.e., a MEMS micro-mirror) integrated on a semiconductor chip. A MEMS mirror according to the embodiments described herein is configured to rotate or tilt about two scanning axes (i.e., a 2D MEMS mirror) that are typically orthogonal to each other. A rotation of the MEMS mirror on a scanning axis may be done so between two predetermined extremum deflection or tilt angles (e.g., +/−15 degrees). An oscillation of the MEMS mirror about a scanning axis may be achieved by driving the MEMS mirror at a resonant frequency about that axis. A Lissajous scanner may be implemented by controlling the steering of the light beams in two dimensions (e.g., in a horizontal x-direction and in a vertical y-direction). In some instances, the MEMS mirror is driven at a first resonant frequency f1 about a first resonant scanning axis and is driven at a second resonant frequency f2 about a second resonant scanning axis. In some instances, frequencies f1 and f2 are the same while in other instances they are different scanning frequencies with a defined frequency ratio/difference therebetween.

In particular, MEMS mirror 12 includes a first scanning axis 13x (e.g., an outer scanning axis) that enables the MEMS mirror 12 to steer light in the x-direction and a second scanning axis 13y (e.g., an inner scanning axis) that enables the MEMS mirror 12 to steer light in the y-direction. Both axes of the single 2D MEMS mirror may be controlled by different phase-locked loops (PLLs). In this way, a single MEMS mirror is able to steer light beams received from the illumination unit 10 in both the x-direction and the y-direction. As a result, the MEMS mirror 12 can direct a light beam at a desired 2D coordinate (e.g., an x-y coordinate) in the field of view. Multiple light beams can be steered by the MEMS mirror 12 at different 2D coordinates of a scanning pattern, such as a Lissajous pattern or a circular pattern.

The MEMS mirror 12 itself may be a resonator (i.e., a resonant MEMS mirror) configured to oscillate "side-to-side" about each of its scanning axes at a resonance frequency such that the light reflected from the MEMS mirror oscillates back and forth in a scanning direction of a respective scanning axis. Each scanning axis may have a non-linear dependency with respect to resonant frequency and maximum deflection amplitude due to the stiffening of the mirror's suspension about that axis. As will be described in further detail below, different resonance frequencies may be used for each scanning axis 13x and 13y for defining a Lissajous pattern.

As will be illustrated in more detail below, each MEMS mirror 12x, 12y, and 12 uses a corrugated membrane that is mechanically coupled to the mirror body of the MEMS mirror as an actuator. The corrugations act as spring elements and at the same time can be used as piezoelectric actuators to drive a tilt motion in multiple tilt (scanning) axes. A portion of the corrugations may also be configured for sensing in order to provide position information (i.e., tilt angle information) for a respective region of the corrugated membrane or for a respective tilt axis. In this way, the position information may be used to compensate one or more driving signals to ensure the resonant frequency f1 of one scanning axis and/or the resonant frequency f2 of the other scanning axis is synchronized with a respective reference frequency. Not only can the actuation of the corrugated membrane be used to implement Lissajous scanning, but other scanning patterns can be achieved as well. For example, circular scanning or quasi-static scanning can also be achieved. The membrane may be made of a piezoelectric material to produce alternating bending forces in response to an electrical signal and generate the oscillation torque. Depending on the configuration, this actuation can be regulated or adjusted by adjusting the drive voltage off time, a voltage level of the drive voltage, or a duty cycle, for example, based on the sensed position information.

The 2D scanning system 100 further includes an illumination unit 10 (i.e., a light transmitter) that includes at least one light source (e.g., at least one laser diode or light emitting diode) that is configured to transmit light beams (pulses) along a transmission path towards the MEMS mirror(s). The illumination unit 10 may sequentially transmit multiple light pulses according to a trigger signal received from a system controller 23.

The 2D scanning system 100 also includes a system controller 23 that is configured to control components of the scanning systems. In certain applications, such as LIDAR, the system controller 23 may also be configured to receive raw data from a light sensor (not illustrated) and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals.

The system controller 23 is configured to generate a trigger signal used to trigger the illumination unit 10 to generate light pulses. Thus, the system controller 23 controls the timing light pulses are fired from the illumination unit 10 via the trigger signal. The system controller 23 is also configured to set a driving frequency of a MEMS mirror for each of its scanning axes and is capable of synchronizing the oscillations about the two scanning axes 13x and 13y. In particular, the system controller 23 is configured to control an actuation of a MEMS mirror about each scanning axis by controlling a respective driving signal. The system controller 23 may control a frequency, a phase, a duty cycle, a high-voltage (HV) level, and/or a low-voltage (LV) level of the driving signal to control the actuation.

The 2D scanning system 100 includes a MEMS driver 25x for driving the MEMS mirror 12 (about the first scanning axis 13x and a MEMS driver 25y for driving the MEMS mirror 12 about the second scanning axis 13y. Each MEMS driver 25x, 25y actuates and may additionally sense the rotation position of the mirror about its respective scanning axis, and provides position information (e.g., tilt/deflection angle or degree of rotation about the rotation axis) of the mirror to the system controller 23. Based on this position information, the laser sources of the illumination unit 10 may be triggered by the system controller 23. Thus, a higher accuracy in position sensing of the MEMS mirror results in a more accurate and precise control of other components of the scanning system.

As noted above, a drive voltage (i.e., an actuation signal or driving signal) is applied by a MEMS driver to an actuator structure of the MEMS mirror (i.e., a portion of the corrugated membrane) that corresponds to its corresponding scanning axis to drive the tilting of the MEMS mirror about that scanning axis. While oscillations at various resonant frequencies may be achieved, quasi-static tilting may also be achieved. During quasi-static, the tilt of the mirror body is held at a specific tilt angle momentarily until a next tilt position is actuated. Thus, the mirror is not in constant motion as it is while in resonance.

The drive voltage can be switched or toggled between an HV level and a LV level resulting in an oscillating driving force. The HV level may be a positive voltage level and the LV level may be a negative voltage level with 0V as a midpoint therebetween. In other words, the HV level and the LV level are equal but opposite voltages. It can be said that the drive voltage is toggled between these two voltage levels. The oscillating driving force causes the mirror to oscillate back and forth on its scanning axis between two extrema. The drive voltage may be a constant drive voltage, meaning that the drive voltage is the same voltage when actuated (i.e., toggled to the HV or the LV level), as is the case with a square wave or may be a sinusoidal wave with the HV level and the LV level being set as the maxima and minima of the sinusoid. Other waveform shapes are also possible. However, it will be understood that the drive voltage is being toggled between HV and LV levels in order to produce the mirror tilt or oscillation. Depending on the configuration, this actuation can be regulated or adjusted by adjusting the voltage levels, the duty cycle, the slope, the frequency, or the phase of a driving signal.

Hence, a light transmission technique includes transmitting the beams of light into the field of view from a transmission mirror that uses two scanning axes to transmit according to a scanning pattern. The transmission mirror may oscillate continuously in resonance about each scanning axes or move quasi-statically such that the beams of light are projected into the field of view that moves across the field of view as the transmission mirror(s) changes the transmission direction. Moreover, additional conditions are set by the system controller 23 in order to synchronize the oscillations about the two scanning axes for generating a Lissajous scanning pattern as a repeatable pattern.

To make the Lissajous pattern reproduce itself periodically with a frame rate FR frequency [Hz], the two resonant scanning axes are each driven at a target scanning frequency f1, f2 with a defined frequency ratio/difference therebetween that forms a repeatable Lissajous pattern (frame) with a frame rate FR. A new frame begins each time the Lissajous pattern restarts, which occurs when a phase difference between a mirror phase about scanning axis 13x and a mirror phase about scanning axis 13y is zero. The system controller 23 may synchronize the oscillations about the two resonant scanning axes to ensure this defined frequency ratio/difference is maintained based on measurements acquired of the oscillations.

In the examples described herein, frequency f1 is the driving frequency in the time domain of a MEMS mirror (e.g., MEMS mirror 12x or 12) about the scanning axis 13x and frequency f2 is the driving frequency in the time domain of a MEMS mirror (e.g., MEMS mirror 12y or 12) about the scanning axis 13y. The oscillations about the two scanning axes may drift out of synchronization and must be brought into synchronization by the system controller 23.

The MEMS drivers 25x and 25y may each receive a respective sense signal (e.g., a current or a voltage) from the corrugated membrane (i.e., the actuator), where the sense signal is extracted from electrodes of a respective scanning axis and represents of a tilt angle of the reflective structure about that scanning axis. For example, the amplitude of the sense signal may be correlated by the driver to a specific tilt angle about a scanning axis. The mirror frequency about a scanning axis may also be determined by monitoring the rate of change of the sense signal or by monitoring the frequency (i.e., rate of occurrence) of zero-crossings of the sense signal as its amplitude oscillates between two extrema. By monitoring the amplitude of the sense signal, each MEMS driver 25x and 25y can detect zero-crossing events and a timing thereof of its respective axis, and can determine the tilt angle of the MEMS mirror 12 at any given moment about its receptive axis.

Additionally, or alternatively, the system controller 23 may receive measurement information from the measurement circuit of the MEMS drivers 25x and 25y and perform processing thereon. Thus, system controller 23 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

The sensing of the position of the MEMS mirror 12 is performed based on a detector that is configured to measure the sense signal. For example, as the MEMS mirror moves, the geometry of the corrugated membrane changes, resulting in a change in the amplitude of the sense signal. Thus, a specific amplitude corresponds directly with a specific position (i.e., tilt angle) of the MEMS mirror about a respective axis. By sensing the amplitude of the sense signal, the MEMS drivers 25x and 25y can monitor and track the oscillations of the mirror, and determine a specific position of the MEMS mirror, including the zero-crossing thereof about their respective axis. A rotation direction (e.g., positive or negative, left-to-right or right-to-left, clockwise or counter-clockwise, etc.) is also detected by measuring a change in capacitance over time, where a positive or a negative change indicates opposing rotation directions.

Since the mirror is driven about a scanning axis at an oscillation frequency, when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

By sensing the rotation position of the MEMS mirror 12 about their respective scanning axes 13x and 13y, the MEMS drivers 25x and 12y can sense zero-crossing (ZC) events of the MEMS mirror 12. A zero-crossing event is an instance when the MEMS mirror 12 has a rotation angle of 0° on its scanning axis. Specifically, it is the moment when the MEMS mirror 12 is parallel to the frame or in a neutral position. The neutral position may also be referred to as a resting position (e.g., when the MEMS mirror 12 comes to a stop after turning off the driving force). Since the MEMS mirror 12 oscillates back and forth between two rotation directions (e.g., clock-wise and counter-clockwise), a zero-crossing event occurs twice during a scanning period—once as the mirror oscillates in the first rotation direction and once as the mirror oscillates in the second rotation direction. It will also be appreciated that angle-crossing events at another predefined angle may also be used instead of a zero-crossing event.

In some embodiments, an event time may correspond to a non-zero-crossing event. For example, the sensed rotation angle may be some angle other than 0°. However, for the purpose of explanation, examples herein will be described in the context of sensing zero-crossing events.

The MEMS drivers 25x and 25y are configured to detect each zero-crossing event and record a timing for each event. This timing information (i.e., measured zero-crossing time) can then be transmitted to the system controller 23 as position information.

FIGS. 2A-2D are cross-sectional views of example system configurations of the 2D scanning system 200 according to one or more embodiments. The system 200 includes a piezoelectric micro mirror as a MEMS mirror 12 and a corrugated actuator that also functions as a suspension system. The MEMS mirror 12 is reflective structure configured to tilt about a first scanning axis 13x and a second scanning axis 13y. The system 200 includes a frame 201 that is rotationally fixed. The frame 201 may be made of a semiconductor substrate. Additionally, the frame 201 may be structured to define a frame recess 202 or cavity over which the MEMS mirror 12 is suspended by a suspension assembly. The suspension assembly is mechanically coupled to and between the MEMS mirror 12 and the frame 201 and is configured to suspend the MEMS mirror 12 over the frame recess 202.

The suspension assembly includes a piezoelectric corrugated structure 203 coupled to and between the MEMS mirror 12 and the frame 201. The piezoelectric corrugated structure 203 may be a corrugated flexible membrane, for example, that can deflect (tilt) about at least two axes. Both the MEMS mirror body and the piezoelectric corrugated structure 203 are made of a piezoelectric material, with the MEMS mirror body having a reflective layer disposed thereon. Piezoelectricity is the electric charge that accumulates in certain solid materials and an electric potential is produced between opposite electrodes.

The outer periphery of the piezoelectric corrugated structure 203 is clamped or otherwise directly coupled to the frame 201 around the periphery of the frame recess 202. The piezoelectric corrugated structure 203 may be ring that is concentric to the MEMS mirror 12. In this way, the outer periphery of the piezoelectric corrugated structure 203 is an outer circumference fully clamped to the frame 201.

The inner periphery (e.g., inner circumference) of the piezoelectric corrugated structure 203 may be fully clamped, and thereby directly coupled, to the MEMS mirror 12. When both the outer periphery and the inner periphery are fully clamped to the frame 201 and to the MEMS mirror 12, respectively, the piezoelectric corrugated structure 203 may include a plurality of holes formed therethrough to allow pressure equalization as the piezoelectric corrugated structure 203 flexes. In the examples shown in FIGS. 2A-2D, the outer periphery and the inner periphery of the piezoelectric corrugated structure 203 are fully clamped to the frame 201 and to the MEMS mirror 12, respectively.

Alternatively, the outer periphery of the piezoelectric corrugated structure 203 may be fully clamped to the frame 201 and an inner periphery of the piezoelectric corrugated structure 203 may be spatially separated from the MEMS mirror 12 by a gap. In this case, the suspension assembly further comprises a pair of torsion bars or beams that are mechanically coupled to and between the inner periphery (e.g., inner circumference) of the piezoelectric corrugated structure 203 and the MEMS mirror 12. The pair of torsion bars may be straight bars that extend along the one of the axes 13x or 13y and are attached to the inner periphery of the piezoelectric corrugated structure 203 at attachment points located on the axis. Alternatively, the pair of torsion bars may be bent bars that are attached to the inner periphery (e.g., inner circumference) of the piezoelectric corrugated structure 203 at attachment points that are offset from the axis.

The piezoelectric corrugated structure 203 includes a first corrugated surface (e.g., an upper surface) comprising concentric rings of alternating peaks 204 and valleys 205 and a second corrugated surface (e.g., a bottom surface) arranged opposite to the first corrugated surface. The shape of the second corrugated surface conforms to the shape of the first corrugated surface.

The piezoelectric corrugated structure 203 further includes peak electrodes 206 with each peak electrode 206 being coupled to a respective peak 204 of the first corrugated surface. In particular, the peak electrodes 206 are integrated within the piezoelectric corrugated structure 203 or may be deposited onto the first corrugated surface (e.g., by a conductor deposition). The piezoelectric corrugated structure 203 further includes valley electrodes 207, each valley electrode 207 being coupled to a respective valley 205 of the first corrugated surface. In particular, the valley electrodes 207 are integrated within the piezoelectric corrugated structure 203 or may be deposited onto the first corrugated surface (e.g., by a conductor deposition). The piezoelectric corrugated structure 203 further includes a common electrode layer 208 coupled to the second corrugated surface, where the common electrode layer 208 is arranged counter to the peak electrodes 206 and to the valley electrodes 207. In other words, the common electrode layer 208 may be a single conductive layer that extends underneath all the peak and valley electrodes. As will be explained in greater detail below, driving signals can be applied to the peak and valley electrodes to cause the piezoelectric corrugated structure 203 to deflect and thereby tilt about one or more axes.

Figure 2A:
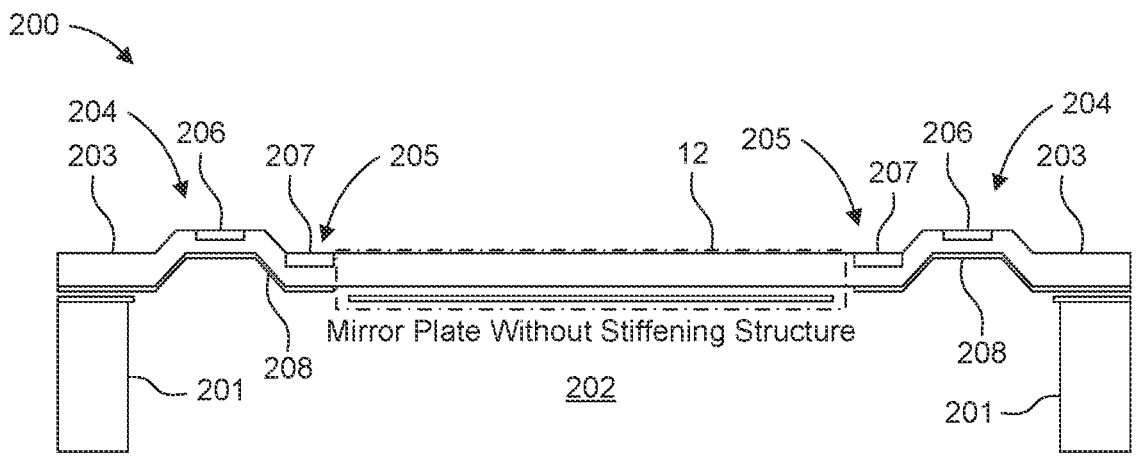
FIGS. 2A-2D are cross-sectional views of example system configurations of the 2D scanning system according to one or more embodiments.
Figure 2B:
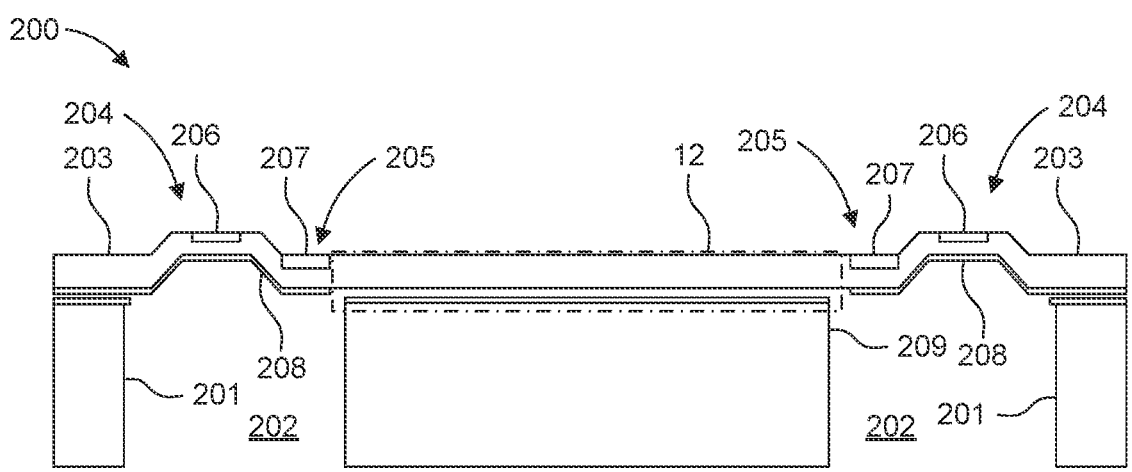
Figure 2C:
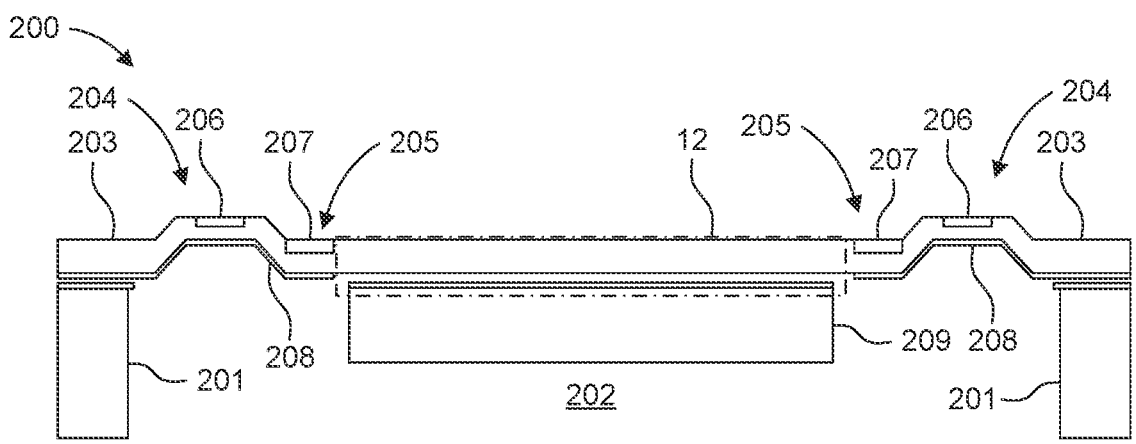

The system 200 may further incudes a stiffening structure 209 that is mechanically coupled to the MEMS mirror 12 and suspended over the frame recess 202 by the suspension assembly. In FIG. 2B, the stiffening structure 209 has the same thickness as the frame 201. In FIG. 2C, the stiffening structure 209 has a smaller thickness when compared to that of the frame 201. The thickness of the stiffening structure 209 allows different tuning of the inertia of the MEMS mirror 12 as it oscillates about an axis. The inertia affects the oscillation frequency and the maximum tilt amplitude of the MEMS mirror 12. Thus, the tuning of the inertia leads to the tuning of the oscillation frequency and the maximum tilt amplitude of the MEMS mirror 12. In addition, the shape of the stiffening structure 209 in a plan view may be symmetric with or asymmetric with the shape of the MEMS mirror 12. The shape of the stiffening structure 209 relative to the MEMS mirror 12 also enables frequency tuning of the oscillation frequencies f1 and f2. For example, if the shape is asymmetric, frequencies f1 and f2 will be different when a same driving signal is applied to axes 13x and 13y.

In FIGS. 2B and 2C, the stiffening structure 209 is coupled underneath the MEMS mirror 12 and resides within the frame recess 202. The stiffening structure 209 may be made from the same semiconductor substrate used for the frame 201 or made from different material, such as polysilicon or silicon nitride.

Figure 2D:
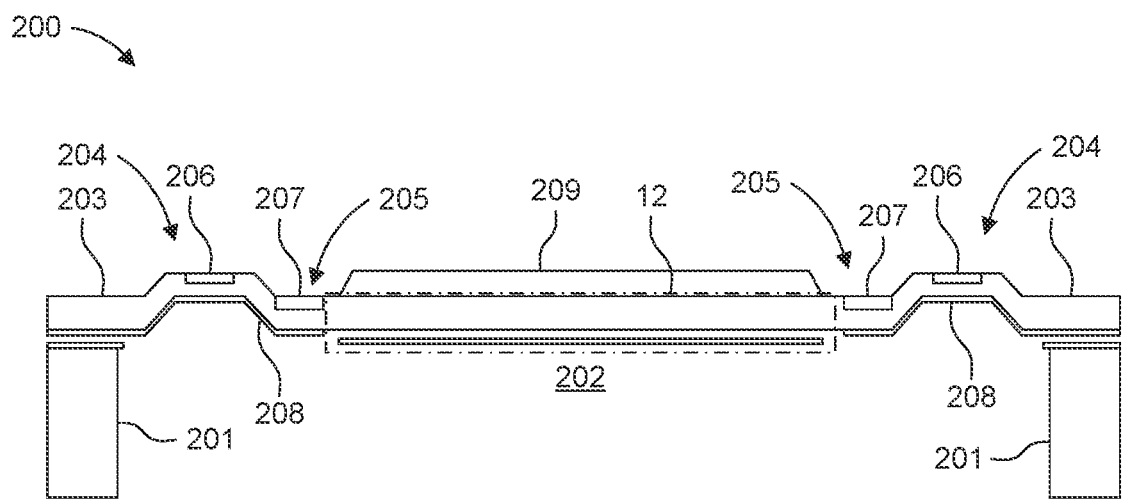

In FIG. 2D, the stiffening structure 209 is coupled onto of the MEMS mirror 12. In FIG. 2D, the stiffening structure 209 may be an oxide layer.

Figure 3A:
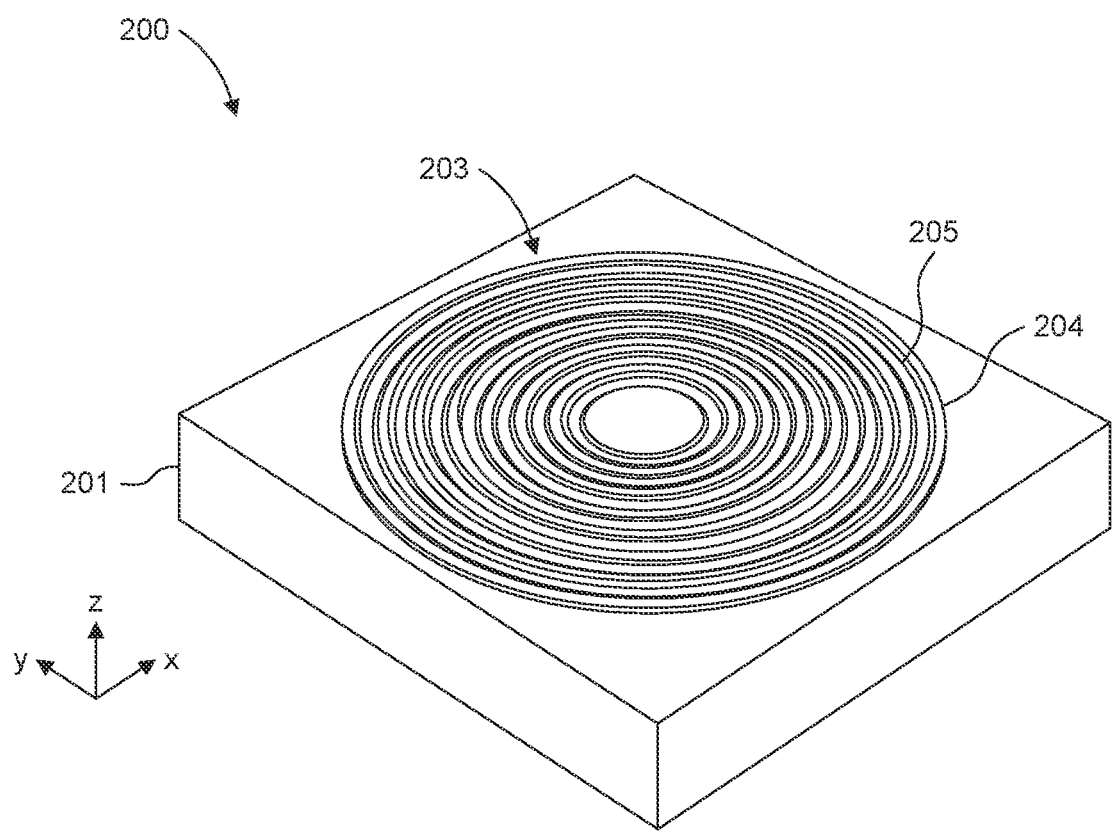
FIG. 3A is a perspective view of the 2D scanning system according to one or more embodiments.

FIG. 3A is a perspective view of the system 200 according to one or more embodiments. The system 200, again, includes the frame 201, the MEMS mirror 12, and the piezoelectric corrugated structure 203. A view of the first corrugated surface (e.g., an upper surface) of the piezoelectric corrugated structure 203 is shown. It can be seen that the piezoelectric corrugated structure 203 includes multiple concentric rings that alternate between peaks 204 and valleys 205 in the radial direction. In this example, the outer most ring is a peak 204 that encircles the MEMS mirror 12. The next outer most ring is a valley that encircles the MEMS mirror 12, and so on.

Figure 3B:
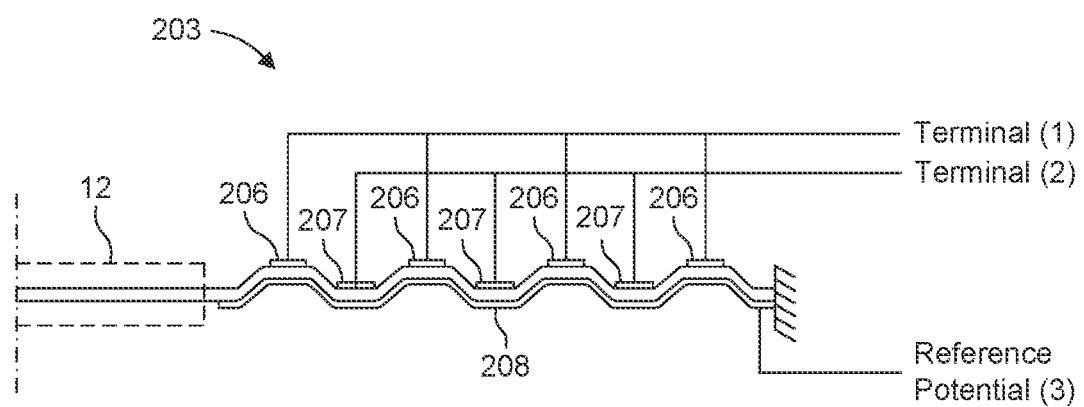
FIG. 3B is a cross-sectional view of half of a piezoelectric corrugated structure according to one or more embodiments.

FIG. 3B is a cross-sectional view of half of the piezoelectric corrugated structure 203 according to one or more embodiments. In particular, an example of the electrical connections to the peak electrodes 206, valley electrodes 207, and the common electrode 208 is shown. The peak electrodes 206 may be electrically coupled to a first terminal for receiving a first signal that may have a varying electrical potential, the valley electrodes 207 may be electrically coupled to a second terminal for receiving a second signal that may have a varying electrical potential, and the common electrode 208 is electrically coupled to a reference potential.

A positive voltage applied to the peak electrodes 206 causes an upward force to be applied to the respective peaks 204 of the first corrugated surface, whereas a negative voltage applied to the valley electrodes 207 causes a downward force to be applied to the valleys 205 of the first corrugated surface. In contrast, a negative voltage applied to the peak electrodes 206 causes a downward force to be applied to the respective peaks 204 of the first corrugated surface and a positive voltage applied to the valley electrodes 207 causes an upward force to be applied to the respective valleys 205 of the first corrugated surface. Thus, in order to excite a tilting movement one driving voltage signal should drive a peak electrode 206 or a group of peak electrodes 206 on one lateral side of the tilting axis and another driving voltage signal should drive a valley electrode 207 of group of valley electrodes 207 that are located an opposite lateral side of the tilting axis.

The corrugation acts as spring element that helps to relax initial layer stress to a target range and pulls the MEMS mirror flat, acts as compliant spring for tilting mode, and shifts the neutral plane to the middle of the corrugation and thus allows for efficient piezoelectric actuation and sensing of mirror motion.

Figure 4:
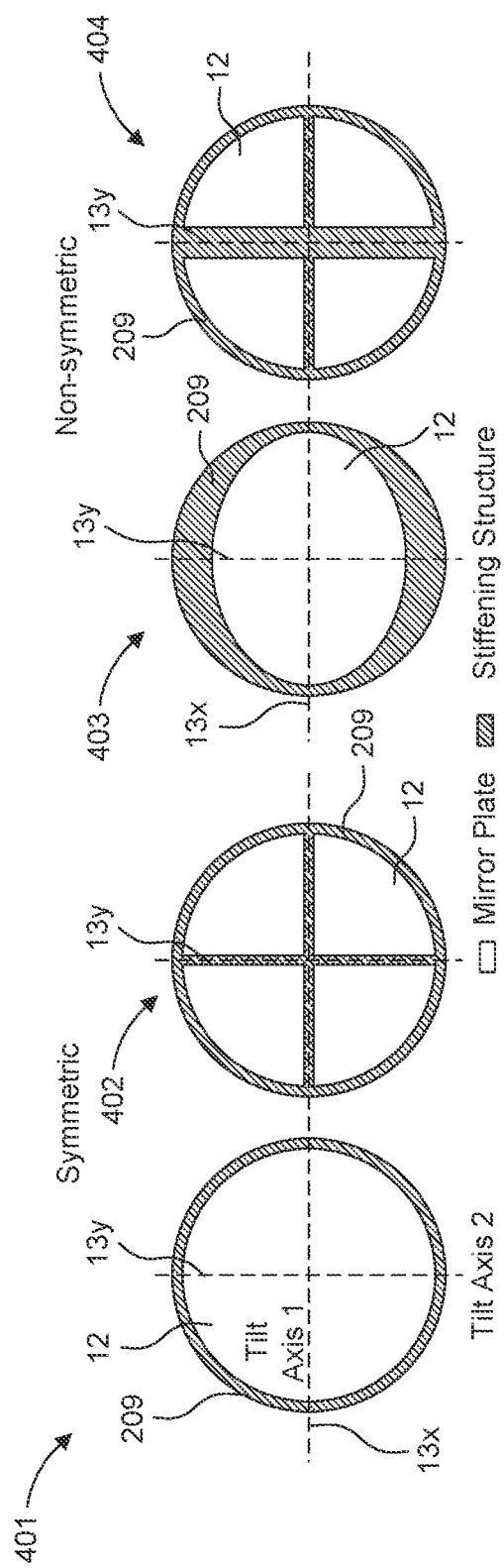
FIG. 4 illustrates a plan view of a MEMS mirror and stiffening structure according to one or more embodiments.

FIG. 4 illustrates a plan view of a MEMS mirror and stiffening structure according to one or more embodiments. In particular, FIG. 4 shows symmetric configurations 401 and 402 where the shape of the MEMS mirror 12 and the stiffening structure 209 are symmetric and asymmetric configurations 403 and 404 where the shape of the MEMS mirror 12 and the stiffening structure 209 are asymmetric. The MEMS mirror 12 may have a circular or an elliptical shape. If the piezoelectric corrugated structure 203 is elliptical, one can achieve a mode separation for the two axes. In the case of a circular design, the resonances of both tilting modes should ideally coincide, which may be a problem due to mode coupling between the two axes.

The MEMS mirror 12 may be a single plate or may be partitioned into separated sections (e.g., separate quadrants). In asymmetric configuration 404, the spacing between the mirror sections about axis 13x is different from the spacing between the mirror sections about axis 13y, giving it an asymmetric configuration. The non-symmetric configurations 403 and 404 have tunable mass partitions that enable the possibility to have different inertias about each tilt axis 13x and 13y. This enables the frequency f1 of axis 13x and the frequency f2 of axis 13y to be tuned independently from each other.

Figure 5:
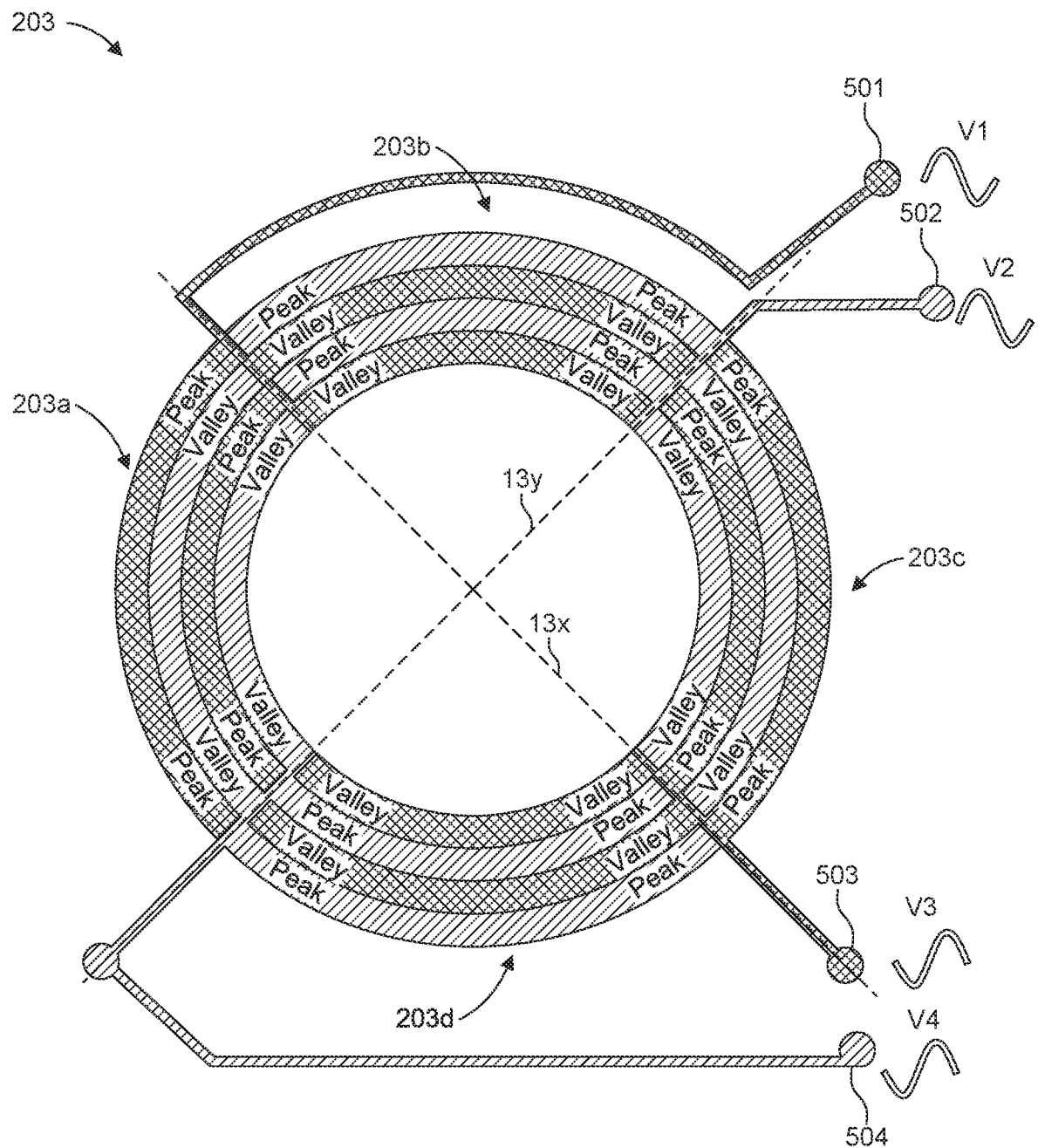
FIG. 5 shows a plan view of an example of the piezoelectric corrugated structure according to one or more embodiments.

FIG. 5 shows a plan view of an example of the piezoelectric corrugated structure 203 according to one or more embodiments. FIG. 5 is directed to driving a rotation or a tilt of the MEMS mirror 12 about axis 13x and driving a rotation or a tilt of the MEMS mirror 12 about axis 13y. Both axes 13x and 13y are used for 2D light steering.

Axis 13x divides the piezoelectric corrugated structure 203 into two semicircles, with one semicircle on one side of axis 13x and the other semicircle on the other side of axis 13x. Likewise, axis 13y divides the piezoelectric corrugated structure 203 into two semicircles, with one semicircle on one side of axis 13y and the other semicircle on the other side of axis 13y. As a result, four quadrants 203a, 203b, 203c, and 203d are formed by the two intersecting axes 13x and 13y.

The piezoelectric corrugated structure 203 includes a first quadrant 203a that includes a first subset of peak electrodes and a second quadrant 203b that includes a first subset of valley electrodes. The first subset of peak electrodes of quadrant 203a and the first subset of valley electrodes of quadrant 203b are arranged within a first semicircle of the piezoelectric corrugated structure 203, the first semicircle being bisected by axis 13x to define the first side and the second side of axis 13x.

The first subset of peak electrodes and the first subset of valley electrodes are electrically coupled together for receiving a first driving signal V1 from terminal 501. In other words, the peak electrodes in the first quadrant 203a are electrically coupled to the valleys of the second quadrant 203b. The first quadrant 203a and the second quadrant 203b are adjacent quadrants having a shared boundary that is collinear with axis 13x such that the first quadrant 203a and the second quadrant 203b are arranged on opposite sides of axis 13x. It is also noted that the peak electrodes and the valley electrodes in the same quadrant are not electrically connected (e.g., do not receive a same driving signal). In other words, the valley electrodes arranged in the first quadrant 203a and the peak electrodes in the second quadrant 203b are electrically isolated from each other as well as from the first subset of peak electrodes arranged in quadrant 203a and the first subset of valley electrodes arranged in quadrant 203b.

The first driving signal V1 is configured to drive the peaks of quadrant 203a and the valleys of quadrant 203b such that when the driving signal is positive, an upward deflection force is applied to the peaks in quadrant 203a while a downward deflection force is applied to the valleys in quadrant 203b, causing a tilting force about axis 13x in one direction. The first driving signal V1 is also able to drive the peaks and valleys such that when the driving signal is negative, a downward deflection force is applied to the peaks in 203a while an upward deflection force is applied to the valleys in quadrant 203b, causing a tilting force about axis 13x in the other direction.

The first driver 25x is configured drive the first driving signal V1 between a maximum positive voltage at which the MEMS mirror 12 is tilted in a first tilt direction at first maximum tilt angle and a maximum negative voltage at which the reflective structure is tilted in a second tilt direction at second maximum tilt angle. Accordingly, the first driver 25x is configured to generate the first driving signal V1 to drive a first tilting motion of the MEMS mirror 12 about axis 13x. The first driver 25x is electrically coupled to the peak electrodes of quadrant 203a and to the valley electrodes of quadrant 203b by terminal 501 for providing the first driving signal V1 to the peak electrodes of quadrant 203a and to the valley electrodes of quadrant 203b to drive the first tilting motion.

The piezoelectric corrugated structure 203 includes the second quadrant 203b that includes a second subset of peak electrodes and a third quadrant 203c that includes a second subset of valley electrodes. The second subset of peak electrodes of quadrant 203b and the second subset of valley electrodes of quadrant 203c are arranged within a second semicircle of the piezoelectric corrugated structure 203, the second semicircle being bisected by axis 13y to define the first side and the second side of axis 13y.

The second subset of peak electrodes and the second subset of valley electrodes are electrically coupled together for receiving a second driving signal V2 from terminal 502. In other words, the peak electrodes in the second quadrant 203b are electrically coupled to the valleys of the third quadrant 203c. The second quadrant 203b and the third quadrant 203c are adjacent quadrants having a shared boundary that is collinear with axis 13y such that the second quadrant 203b and the third quadrant 203c are arranged on opposite sides of axis 13y. It is also noted that the peak electrodes and the valley electrodes in the same quadrant are not electrically connected (e.g., do not receive a same driving signal). In other words, the valley electrodes arranged in the second quadrant 203b and the peak electrodes in the third quadrant 203c are electrically isolated from each other as well as from the second subset of peak electrodes arranged in quadrant 203b and the second subset of valley electrodes arranged in quadrant 203c.

The second driving signal V2 is configured to drive the peaks of quadrant 203b and the valleys of quadrant 203c such that when the driving signal is positive, an upward deflection force is applied to the peaks in quadrant 203b while a downward deflection force is applied to the valleys in quadrant 203c, causing a tilting force about axis 13y in one direction. The second driving signal V2 is also able to drive the peaks and valleys such that when the driving signal is negative, a downward deflection force is applied to the peaks in 203b while an upward deflection force is applied to the valleys in quadrant 203c, causing a tilting force about axis 13y in the other direction.

The second driver 25y is configured drive the second driving signal V2 between a maximum positive voltage at which the MEMS mirror 12 is tilted in a first tilt direction at first maximum tilt angle and a maximum negative voltage at which the reflective structure is tilted in a second tilt direction at second maximum tilt angle. The maximum positive and negative voltages of the second driving signal V2 may be the same or different with respect to those of the first driving signal V1. Accordingly, the second driver 25y is configured to generate the second driving signal V2 to drive a second tilting motion of the MEMS mirror 12 about axis 13y. The second driver 25y is electrically coupled to the peak electrodes of quadrant 203b and to the valley electrodes of quadrant 203c by terminal 502 for providing the second driving signal V2 to the peak electrodes of quadrant 203b and to the valley electrodes of quadrant 203c to drive the second tilting motion.

The piezoelectric corrugated structure 203 includes the third quadrant 203c that includes a third subset of peak electrodes and a fourth quadrant 203d that includes a third subset of valley electrodes. The third subset of peak electrodes of quadrant 203c and the third subset of valley electrodes of quadrant 203d are arranged within a third semicircle of the piezoelectric corrugated structure 203, the third semicircle being bisected by axis 13x to define the first side and the second side of axis 13x.

The third subset of peak electrodes and the third subset of valley electrodes are electrically coupled together for receiving a third driving signal V3 from terminal 503. In other words, the peak electrodes in the third quadrant 203c are electrically coupled to the valleys of the fourth quadrant 203d. The third quadrant 203c and the fourth quadrant 203d are adjacent quadrants having a shared boundary that is collinear with axis 13x such that the third quadrant 203c and the fourth quadrant 203d are arranged on opposite sides of axis 13x. It is also noted that the peak electrodes and the valley electrodes in the same quadrant are not electrically connected (e.g., do not receive a same driving signal). In other words, the valley electrodes arranged in the third quadrant 203c and the peak electrodes in the fourth quadrant 203d are electrically isolated from each other as well as from the third subset of peak electrodes arranged in quadrant 203c and the third subset of valley electrodes arranged in quadrant 203d.

The third driving signal V3 is configured to drive the peaks of quadrant 203c and the valleys of quadrant 203d such that when the driving signal is positive, an upward deflection force is applied to the peaks in quadrant 203c while a downward deflection force is applied to the valleys in quadrant 203d, causing a tilting force about axis 13x in one direction. The third driving signal V3 is also able to drive the peaks and valleys such that when the driving signal is negative, a downward deflection force is applied to the peaks in 203c while an upward deflection force is applied to the valleys in quadrant 203d, causing a tilting force about axis 13x in the other direction.

The first driver 25x is configured drive the third driving signal V3 between a maximum positive voltage at which the MEMS mirror 12 is tilted in a first tilt direction at first maximum tilt angle and a maximum negative voltage at which the reflective structure is tilted in a second tilt direction at second maximum tilt angle. Accordingly, the first driver 25x is configured to generate the third driving signal V3 to drive the first tilting motion of the MEMS mirror 12 about axis 13x. The first driver 25x is electrically coupled to the peak electrodes of quadrant 203c and to the valley electrodes of quadrant 203d by terminal 503 for providing the third driving signal V3 to the peak electrodes of quadrant 203c and to the valley electrodes of quadrant 203d to drive the first tilting motion. In other words, the tilting force applied to the peaks of quadrant 203c and to the valleys of quadrant 203d assist in generating the first tilting motion about axis 13x. A maximum tilting force is applied about axis 13x when the third driving signal V3 is 180° out of phase with the first driving V1. However, it will be appreciated that the first and third driving signals may be in-phase with each other or out-of-phase with each other by any phase shift amount.

The piezoelectric corrugated structure 203 includes the fourth quadrant 203d that includes a fourth subset of peak electrodes and the first quadrant 203a that includes a fourth subset of valley electrodes. The fourth subset of peak electrodes of quadrant 203d and the fourth subset of valley electrodes of quadrant 203a are arranged within a fourth semicircle of the piezoelectric corrugated structure 203, the fourth semicircle being bisected by axis 13y to define the first side and the second side of axis 13y.

The fourth subset of peak electrodes and the fourth subset of valley electrodes are electrically coupled together for receiving a fourth driving signal V4 from terminal 504. In other words, the peak electrodes in the fourth quadrant 203d are electrically coupled to the valleys of the first quadrant 203a. The fourth quadrant 203d and the first quadrant 203a are adjacent quadrants having a shared boundary that is collinear with axis 13y such that the fourth quadrant 203d and the first quadrant 203a are arranged on opposite sides of axis 13y. It is also noted that the peak electrodes and the valley electrodes in the same quadrant are not electrically connected (e.g., do not receive a same driving signal). In other words, the valley electrodes arranged in the fourth quadrant 203d and the peak electrodes in the first quadrant 203a are electrically isolated from each other as well as from the fourth subset of peak electrodes arranged in quadrant 203d and the fourth subset of valley electrodes arranged in quadrant 203a.

The fourth driving signal V4 is configured to drive the peaks of quadrant 203d and the valleys of quadrant 203a such that when the driving signal is positive, an upward deflection force is applied to the peaks in quadrant 203d while a downward deflection force is applied to the valleys in quadrant 203a, causing a tilting force about axis 13y in one direction. The fourth driving signal V4 is also able to drive the peaks and valleys such that when the driving signal is negative, a downward deflection force is applied to the peaks in 203d while an upward deflection force is applied to the valleys in quadrant 203a, causing a tilting force about axis 13y in the other direction.

The second driver 25y is configured drive the fourth driving signal V4 between a maximum positive voltage at which the MEMS mirror 12 is tilted in a first tilt direction at first maximum tilt angle and a maximum negative voltage at which the reflective structure is tilted in a second tilt direction at second maximum tilt angle. Accordingly, the second driver 25y is configured to generate the fourth driving signal V4 to drive the second tilting motion of the MEMS mirror 12 about axis 13y. The second driver 25y is electrically coupled to the peak electrodes of quadrant 203d and to the valley electrodes of quadrant 203a by terminal 504 for providing the fourth driving signal V4 to the peak electrodes of quadrant 203d and to the valley electrodes of quadrant 203a to drive the second tilting motion. In other words, the tilting force applied to the peaks of quadrant 203d and to the valleys of quadrant 203a assist in generating the second tilting motion about axis 13y. A maximum tilting force is applied about axis 13y when the fourth driving signal V4 is 180° out of phase with the second driving V2. However, it will be appreciated that the second and fourth driving signals may be in-phase with each other or out-of-phase with each other by any phase shift amount.

In the alternative to using terminals 502 and 503 for providing driving signals V2 and V3 respectively, the terminals may instead be used as sense terminals for receiving a sense signal V2 or V3 from their respective peak and valley electrodes. The amplitude of each sense signal is representative of a tilt angle of the MEMS mirror about the axis 13x or axis 13y. For example, as a sense signal, V2 would be representative of a tilt angle of the MEMS mirror 12 about the axis 13y and, as a sense signal, V3 would be representative of a tilt angle of the MEMS mirror 12 about the axis 13x. Terminals 502 and 503 can extract the sense signals V2 and V3 from the piezoelectric corrugated structure 203 and provide them to the system controller 23. The controller 23 may be configured to receive sense signal V2 and control at least one parameter of the fourth driving signal V4 based on the sense signal V2. For example, the system controller 23 may control a frequency, a phase, a duty cycle, a high-voltage (HV) level, and/or a low-voltage (LV) level of the fourth driving signal V4 to control the actuation about axis 13y. Similarly, the controller 23 may be configured to receive sense signal V3 and control at least one parameter of the first driving signal V1 based on the sense signal V3. For example, the system controller 23 may control a frequency, a phase, a duty cycle, a high-voltage (HV) level, and/or a low-voltage (LV) level of the first driving signal V1 to control the actuation about axis 13x.

Figure 6A:
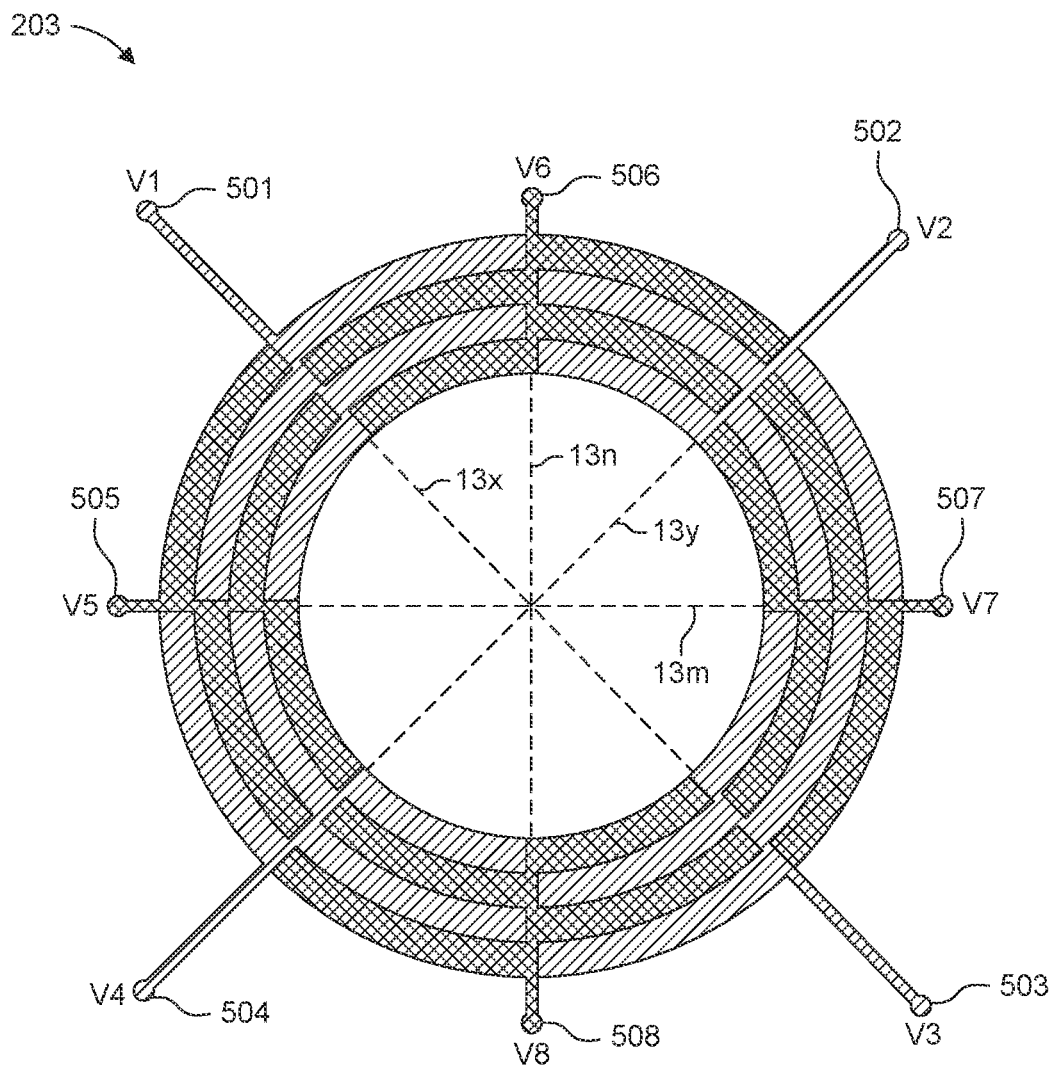
FIGS. 6A and 6B show plan views of additional examples of the piezoelectric corrugated structure according to one or more embodiments.
Figure 6B:
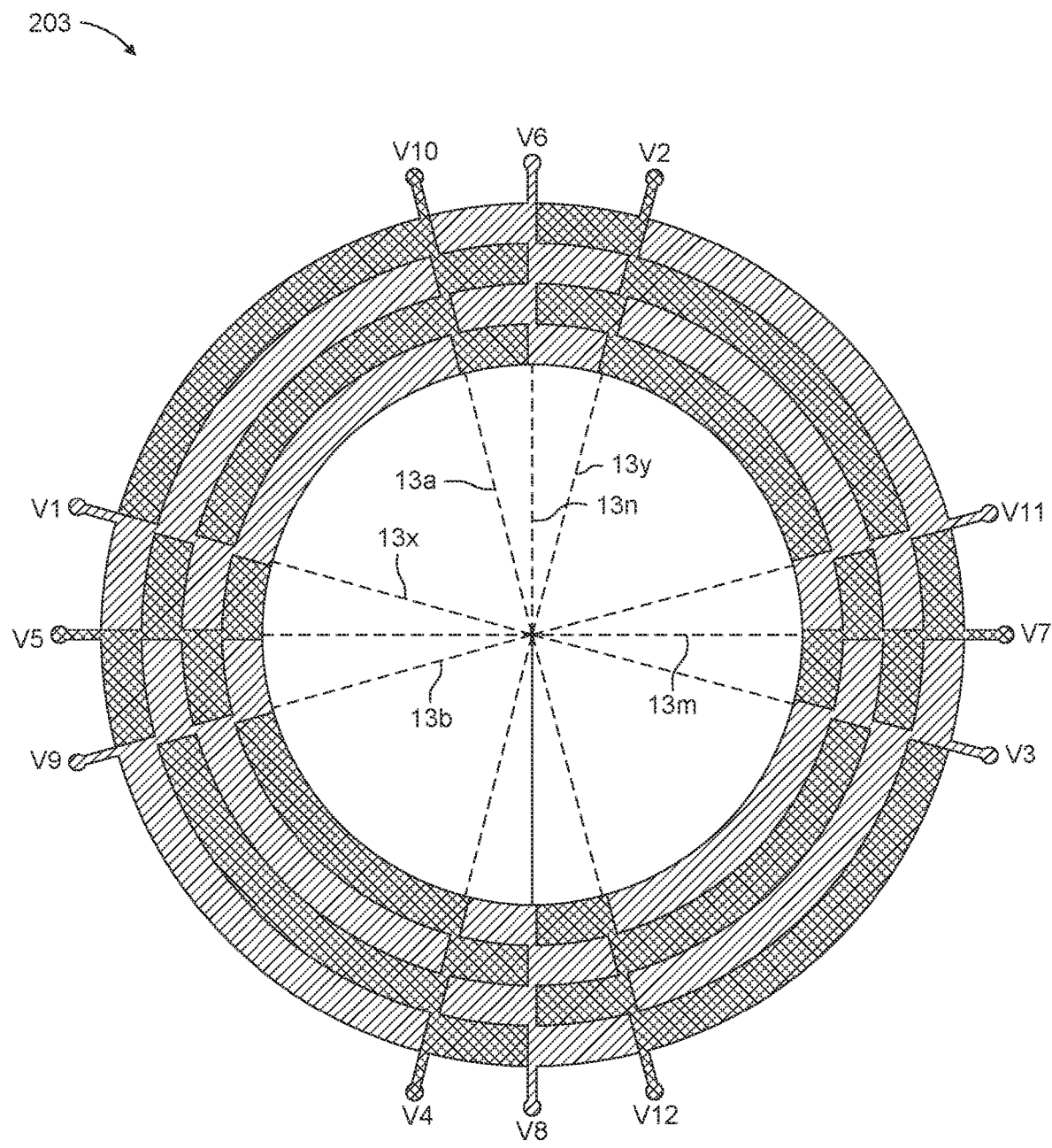

FIGS. 6A and 6B show plan views of additional examples of the piezoelectric corrugated structure 203 according to one or more embodiments. The piezoelectric corrugated structures 203 in FIGS. 6A and 6B have more than two tilt axes, that include axes 13x, 13y, 13m, 13n, 13a, and 13b. Each axis has a set of peak electrodes arranged on one side of the axis electrically coupled to a set of valley electrodes arranged on the other side of the axis that are driven by a driving signal to cause a tilting motion about that axis, as similarly described above. The additional axes provide additional degrees of freedom. For example, a circular or an elliptical scan can be employed using tilting motions about these additional axes.

In FIG. 6A, four axes 13x, 13y, 13m, and 13n are shown. Eight terminals 501-508 are used to provide up to eight driving signals V1-V8. In FIG. 6B, six axes 13x, 13y, 13m, 13n, 13a, and 13b are shown. Twelve terminals 501-512 are used to provide up to twelve driving signals V1-V12. In the examples described above, the driving signals may have the same or different frequencies, in any combination, to achieve the desired mirror motion that leads to the desired scanning pattern.

Figure 7A:
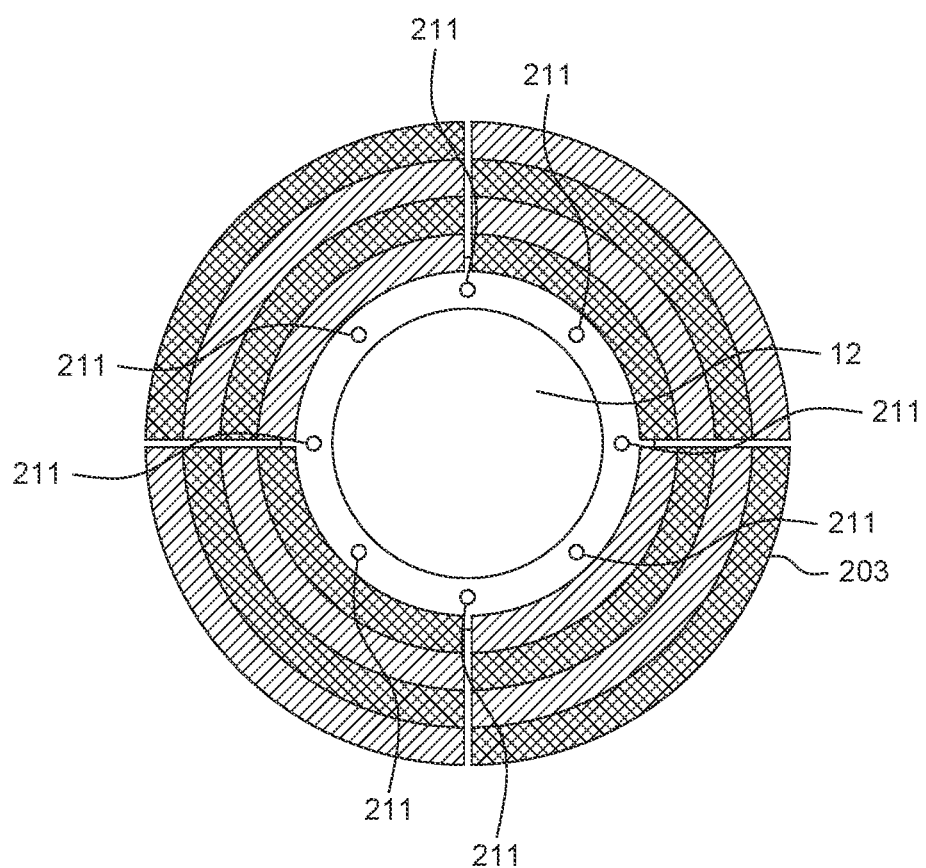
FIG. 7A is a plan view of a system according to one or more embodiments.

FIG. 7A is a plan view of a system according to one or more embodiments. The piezoelectric corrugated structure 203 in this example is fully clamped to both the frame 201 and the MEMS mirror 12. As a result, holes 211 are formed through the piezoelectric corrugated structure 203 to allow pressure equalization as the piezoelectric corrugated structure 203 flexes.

Figure 7B:
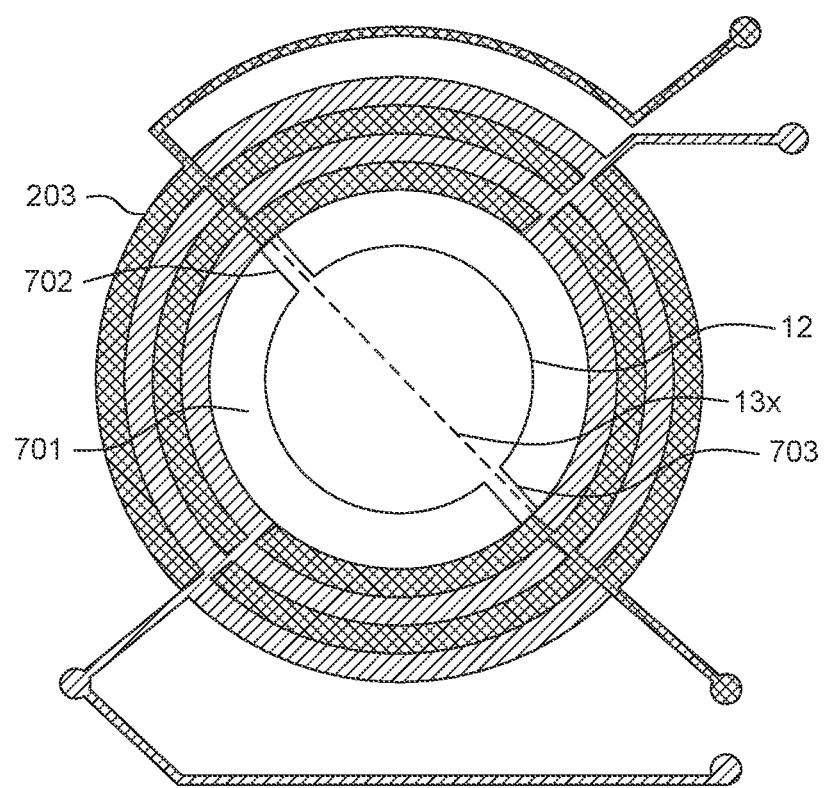
FIG. 7B is a plan view of a system according to one or more embodiments.

FIG. 7B is a plan view of a system according to one or more embodiments. In this example, the piezoelectric corrugated structure 203 has its outer circumference fully clamped to the frame 201 and has its inner circumference spatially separated from the MEMS mirror 12 by a gap 701. In this case, the suspension assembly further comprises a pair of torsion bars 702 and 703 that are mechanically coupled to and between the inner circumference of the piezoelectric corrugated structure 203 and the MEMS mirror 12. The pair of torsion bars 702 and 703 enable rotation about axis 13x and are straight bars that extend along one of the axes (e.g., axis 13x) and are attached to the inner circumference of the piezoelectric corrugated structure 703 at attachment points located on the axis.

Figure 7C:
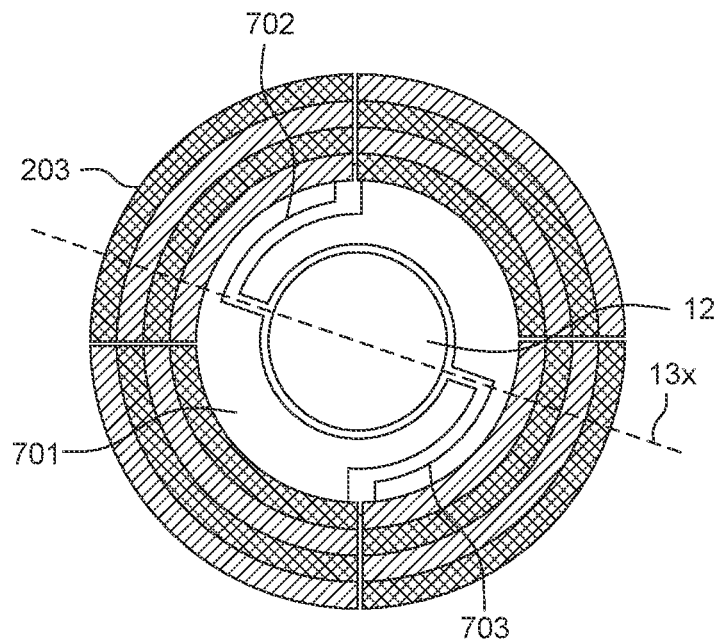
FIG. 7C is a plan view of a system according to one or more embodiments.

FIG. 7C is a plan view of a system according to one or more embodiments. In this example, the piezoelectric corrugated structure 203 has its outer circumference fully clamped to the frame 201 and has its inner circumference spatially separated from the MEMS mirror 12 by a gap 701. In this case, the suspension assembly further comprises a pair of torsion bars 702 and 703 that are mechanically coupled to and between the inner circumference of the piezoelectric corrugated structure 203 and the MEMS mirror 12. The pair of torsion bars 702 and 703 enable rotation about axis 13x and are bent bars that are attached to the inner circumference of the piezoelectric corrugated structure at attachment points that are aligned the axis 13x. However, the attachment points to the inner circumference of the piezoelectric corrugated structure 203 are offset from the axis 13x.

Figure 7D:
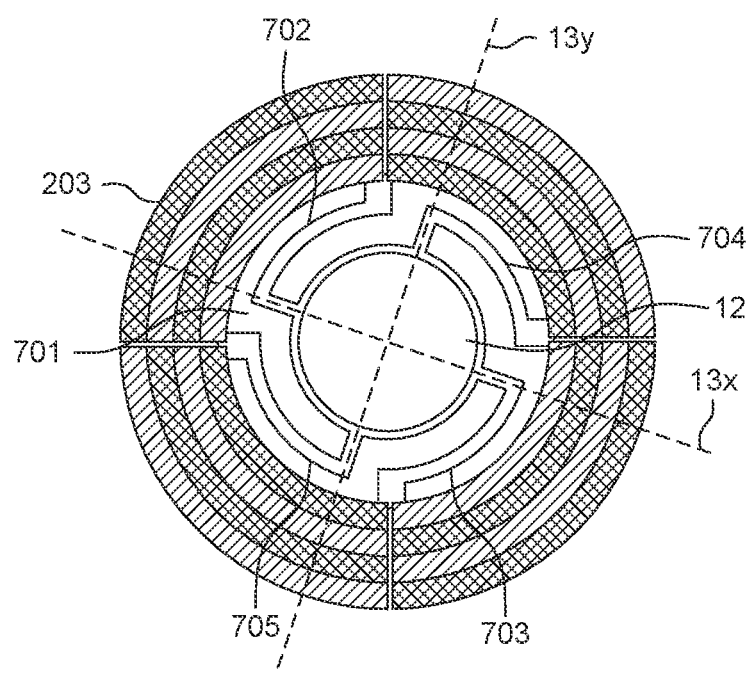
FIG. 7D is a plan view of a system according to one or more embodiments.

FIG. 7D is a plan view of a system according to one or more embodiments. In this example, the piezoelectric corrugated structure 203 has its outer circumference fully clamped to the frame 201 and has its inner circumference spatially separated from the MEMS mirror 12 by a gap 701. In this case, the suspension assembly further comprises a first pair of torsion bars 702 and 703 that are mechanically coupled to and between the inner circumference of the piezoelectric corrugated structure 203 and the MEMS mirror 12 and a second pair of torsion bars 704 and 705 that are mechanically coupled to and between the inner circumference of the piezoelectric corrugated structure 203 and the MEMS mirror 12. The first pair of torsion bars 702 and 703 enable rotation about axis 13x and are bent bars that are attached to the inner circumference of the piezoelectric corrugated structure at attachment points that are aligned the axis 13x. However, the attachment points to the inner circumference of the piezoelectric corrugated structure 203 are offset from the axis 13x. The second pair of torsion bars 704 and 705 enable rotation about axis 13y and are bent bars that are attached to the inner circumference of the piezoelectric corrugated structure at attachment points that are aligned the axis 13y. However, the attachment points to the inner circumference of the piezoelectric corrugated structure 203 are offset from the axis 13y.

Although embodiments described herein relate to a MEMS device with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A light steering system, comprising:
    a reflective structure configured to tilt about a first axis;
    a frame that is rotationally fixed, the frame comprising a frame recess over which the reflective structure is suspended; and a suspension assembly mechanically coupled to and between the reflective structure and the frame, the suspension assembly configured to suspend the reflective structure over the frame recess, wherein the suspension assembly comprises:

a piezoelectric corrugated structure coupled to and between the reflective structure and the frame, wherein the piezoelectric corrugated structure comprises:

a first corrugated surface comprising concentric rings of alternating peaks and valleys;

a second corrugated surface arranged opposite to the first corrugated surface;

a plurality of peak electrodes, each peak electrode being coupled to a respective peak of the first corrugated surface;

a plurality of valley electrodes, each valley electrode being coupled to a respective valley of the first corrugated surface; and a common electrode layer coupled to the second corrugated surface, wherein the common electrode layer is arranged counter to the plurality of peak electrodes and to the plurality of valley electrodes.

2. The light steering system of claim 1, further comprising:

a first driver configured to generate a first driving signal to drive a first tilting motion of the reflective structure about the first axis, wherein the first driver is electrically coupled to a first subset of peak electrodes of the plurality of peak electrodes and a first subset of valley electrodes of the plurality of valley electrodes for providing the first driving signal to the first subset of peak electrodes and the first subset of valley electrodes to drive the first tilting motion.

3. The light steering system of claim 2, wherein:

the first driver is configured to generate a second driving signal to drive the first tilting motion of the reflective structure about the first axis, wherein the first driver is electrically coupled to a second subset of peak electrodes of the plurality of peak electrodes and a second subset of valley electrodes of the plurality of valley electrodes for providing the second driving signal to the second subset of peak electrodes and the second subset of valley electrodes to drive the first tilting motion.

4. The light steering system of claim 3, wherein the second driving signal is out of phase with respect to the first driving signal.

5. The light steering system of claim 2, wherein:

the first corrugated surface includes a first quadrant including the first subset of peak electrodes and a second quadrant including the first subset of valley electrodes, and the first quadrant and the second quadrant are adjacent quadrants having a shared boundary that is collinear with the first axis such that the first quadrant and the second quadrant are arranged on opposite sides of the first axis.

6. The light steering system of claim 5, wherein:

the first subset of peak electrodes and the first subset of valley electrodes are electrically connected, and valley electrodes arranged in the first quadrant and peak electrodes in the second quadrant are electrically isolated from the first subset of peak electrodes and the first subset of valley electrodes.

7. The light steering system of claim 2, wherein:

the first subset of peak electrodes is arranged at a first side of the first axis and the first subset of valley electrodes is arranged at a second side of the first axis opposite to the first side of the first axis.

8. The light steering system of claim 7, wherein the first subset of peak electrodes and the first subset of valley electrodes are arranged within a first semicircle of the piezoelectric corrugated structure, the first semicircle being bisected by the first axis to define the first side and the second side of the first axis.

9. The light steering system of claim 2, wherein the first subset of peak electrodes and the first subset of valley electrodes are electrically coupled together for receiving the first driving signal.

10. The light steering system of claim 2, wherein the reflective structure is configured to tilt about a second axis, the light steering system further comprises:

a second driver configured to generate a second driving signal to drive a second tilting motion of the reflective structure about the second axis, wherein the second driver is electrically coupled to a second subset of peak electrodes of the plurality of peak electrodes and a second subset of valley electrodes of the plurality of valley electrodes for providing the second driving signal to the second subset of peak electrodes and the second subset of valley electrodes to drive the second tilting motion.

11. The light steering system of claim 10, wherein:

the second driver is configured to generate a third driving signal to drive the second tilting motion of the reflective structure about the second axis, wherein the second driver is electrically coupled to a third subset of peak electrodes of the plurality of peak electrodes and a third subset of valley electrodes of the plurality of valley electrodes for providing the third driving signal to the third subset of peak electrodes and the third subset of valley electrodes to drive the second tilting motion.

12. The light steering system of claim 11, wherein:

the first driver is configured to generate a fourth driving signal to drive the first tilting motion of the reflective structure about the first axis, wherein the first driver is electrically coupled to a fourth subset of peak electrodes of the plurality of peak electrodes and a fourth subset of valley electrodes of the plurality of valley electrodes for providing the fourth driving signal to the fourth subset of peak electrodes and the fourth subset of valley electrodes to drive the first tilting motion.

13. The light steering system of claim 2, wherein the first driver is electrically coupled to a second subset of peak electrodes of the plurality of peak electrodes and a second subset of valley electrodes of the plurality of valley electrodes for receiving a sense signal therefrom, wherein the sense signal is representative of a tilt angle of the reflective structure about the first axis.

14. The light steering system of claim 13, further comprising:

a controller configured to receive the sense signal and control at least one parameter of the first driving signal based on the sense signal.

15. The light steering system of claim 13, wherein:

the first subset of peak electrodes and the second subset of valley electrodes are arranged at a first side of the first axis, the first subset of valley electrodes and the second subset of peak electrodes are arranged at a second side of the first axis opposite to the first side of the first axis, the first subset of peak electrodes and the first subset of valley electrodes being arranged within a first semicircle of the piezoelectric corrugated structure, the first semicircle being bisected by the first axis to define the first side and the second side of the first axis, and the second subset of peak electrodes and the second subset of valley electrodes being arranged within a second semicircle of the piezoelectric corrugated structure, the second semicircle being bisected by the first axis to define the first side and the second side of the first axis.

16. The light steering system of claim 2, wherein the first driver is configured to drive the first driving signal between a maximum positive voltage at which the reflective structure is tilted in a first tilt direction at first maximum tilt angle and a maximum negative voltage at which the reflective structure is tilted in a second tilt direction at second maximum tilt angle.

17. The light steering system of claim 16, wherein:
a positive voltage applied to the first subset of peak electrodes causes an upward force to be applied to the respective peaks of the first corrugated surface,
a negative voltage applied to the first subset of valley electrodes causes a downward force to be applied to the respective valleys of the first corrugated surface,
a negative voltage applied to the first subset of peak electrodes causes a downward force to be applied to the respective peaks of the first corrugated surface, and
a positive voltage applied to the first subset of valley electrodes causes an upward force to be applied to the respective valleys of the first corrugated surface.

18. The light steering system of claim 1, wherein the piezoelectric corrugated structure is a corrugated flexible membrane.

19. The light steering system of claim 1, wherein the piezoelectric corrugated structure is a ring concentric to the reflective structure.

20. The light steering system of claim 19, wherein the piezoelectric corrugated structure comprises an outer circumference fully clamped to the frame and an inner circumference fully clamped to the reflective structure.

21. The light steering system of claim 20, wherein the piezoelectric corrugated structure comprises a plurality of holes formed therethrough to allow pressure equalization.

22. The light steering system of claim 19, wherein the piezoelectric corrugated structure comprises an outer circumference fully clamped to the frame and an inner circumference spatially separated from the reflective structure, wherein the suspension assembly further comprises a pair of torsion bars that are mechanically coupled to and between the inner circumference of the piezoelectric corrugated structure and the reflective structure.

23. The light steering system of claim 22, wherein the pair of torsion bars are straight bars that extend along the first axis and are attached to the inner circumference of the piezoelectric corrugated structure at attachment points located on the first axis.

24. The light steering system of claim 22, wherein the pair of torsion bars are bent bars that are attached to the inner circumference of the piezoelectric corrugated structure at attachment points that are aligned with the first axis.

25. The light steering system of claim 19, wherein the piezoelectric corrugated structure comprises an outer circumference fully clamped to the frame and an inner circumference spatially separated from the reflective structure, wherein the suspension assembly further comprises a pair of torsion bars that extend along the first axis, the pair of torsion bars being mechanically coupled to and between the inner circumference of the piezoelectric corrugated structure and the reflective structure.

26. The light steering system of claim 1, wherein the reflective structure is a microelectromechanical system (MEMS) mirror having a circular or an elliptical shape.

27. The light steering system of claim 10, further comprising:
a stiffening structure coupled to the reflective structure and suspended over the frame recess by the suspension assembly, where the stiffening structure and the reflective structure are structured such that the reflective structure has different inertias about the first axis and the second axis.

* * * * *